(12) United States Patent
Distelhoff et al.

(10) Patent No.: US 6,395,215 B1
(45) Date of Patent: May 28, 2002

(54) METHOD OF PRODUCING A PLASTIC COMPONENT AND FUEL TANK FOR A MOTOR VEHICLE

(75) Inventors: Markus Distelhoff; Karl Eck, both of Frankfurt; Winfried Fröhlich, Bad Camberg; Dieter Keller, Aschaffenburg; Justus Klöker, Neu Anspach; Knut Meyer, Essen; Ingo Mohr, Höhn; Bernd Rumpf, Nidderau-Windecken; Wolfgang Sinz, Sulzbach; Rainer Moser, Idstein, all of (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/547,261

(22) Filed: Apr. 11, 2000

(30) Foreign Application Priority Data

Apr. 13, 1999 (DE) .......................... 199 16 494

(51) Int. Cl.⁷ .......................... B29C 65/34; B29C 65/30
(52) U.S. Cl. ............... 264/449; 264/516; 264/573; 264/263; 264/271.1; 264/275.1; 156/274.2; 156/380.2
(58) Field of Search ............... 264/449, 248, 264/573, 516, 263, 271.1, 279.1; 156/274.2, 273.9, 380.2, 379.7, 156, 69

(56) References Cited

U.S. PATENT DOCUMENTS

| | | | |
|---|---|---|---|
| 3,383,260 A | 5/1968 | Mojonner | |
| 4,586,624 A | * 5/1986 | Shaw | 220/67 |
| 4,618,168 A | * 10/1986 | Thalmann et al. | 285/21 |
| 4,801,343 A | 1/1989 | Tamba et al. | |
| 5,820,720 A | * 10/1998 | Campbell | 156/273.9 |
| 5,862,585 A | * 1/1999 | Tessier | 29/168 |
| 5,864,091 A | * 1/1999 | Sumida | 174/50 |
| 5,968,442 A | * 10/1999 | Sato et al. | 264/449 |

FOREIGN PATENT DOCUMENTS

| | | |
|---|---|---|
| DE | 3717608 | 12/1988 |
| DE | 19519341 | 6/1996 |
| DE | 19627742 | 1/1998 |
| FR | 1581045 | 9/1969 |
| GB | 902769 | 8/1962 |
| GB | 1236419 | 6/1971 |
| JP | 57-70612 | * of 1982 |
| JP | 59-118426 | * of 1984 |
| JP | 62-288029 | * of 1987 |

* cited by examiner

Primary Examiner—Jan H. Silbaugh
Assistant Examiner—Stefan Staicovici
(74) Attorney, Agent, or Firm—Mayer, Brown, Rowe & Maw

(57) ABSTRACT

In a method of producing a fuel tank from plastic, a heating element is located between two shell parts to be welded to one another. When the shell parts are pressed together, the heating element melts into the plastic and produces a weld that provides a fuel-resistant seal. The fuel tank subsequently has a particularly exact shape.

7 Claims, 2 Drawing Sheets

METHOD OF PRODUCING A PLASTIC COMPONENT AND FUEL TANK FOR A MOTOR VEHICLE

FIELD OF THE INVENTION

The present invention relates generally to a method of producing a plastic component, and in particular a fuel tank for a motor vehicle in which primary shell parts are produced from plastic by the injection-molding process, and in which abutting weld edges of the shell parts are heated and pressed together with one another for welding. The invention also concerns a fuel tank for a motor vehicle having a plurality of shell parts produced from plastic by the injection-molding process and welded with one another.

BACKGROUND OF THE INVENTION

There has become known in practice a method of producing a plastic component designed as a fuel tank in which the shell parts of the fuel tank each have a peripheral, planar weld edge. Components to be arranged in the fuel tank, such as a surge chamber or baffle elements for example, can be produced by the injection-molding process on the inner side of the shell parts or be fastened thereupon before welding the shell parts. For welding by their weld edges, the shell parts are each pressed onto a heated plate, until the plastic melts. The shell parts are subsequently pressed together by their weld edges.

A disadvantage of the known method is that, for reliable welding that provides a fuel-resistant seal, the shell parts require very wide weld edges and particularly high pressures for pressing the weld edges. Therefore, the plastic component produced by this method has very high tolerances.

Therefore, there is a need for a method for producing a plastic component in such a way that it makes it possible for very close tolerances of the plastic component to be maintained. Furthermore, there is a need for a plastic container which provides a reliable seal and is of a precise shape.

Other needs will become apparent upon a further reading of the following detailed description taken in conjunction with the drawings.

SUMMARY OF THE INVENTION

The aforementioned needs are fulfilled according to the present invention by producing a plastic container having, shell parts with weld edge projections pointing toward the respectively opposite shell part and by heating the flanks of the projections of two weld edges to be connected to one another.

By devising the method in this way, the shell parts are heated in a region of the weld edges other than the region where they perpendicularly abut. As a result, the shape of the plastic molding can be fixed by the non-heated regions of the weld edges or by overlapping regions of the projections being pressed against one another. The plastic component produced by the method according to the invention can therefore be produced with particularly close tolerances.

According to an advantageous development, the projections can be shaped in virtually any way desired if the projections are produced by the injection-molding process. As a result, the projections of mutually opposite weld edges can engage in one another, for example in a labyrinthal manner.

Plastic components produced by the known method can have only simple geometrical shapes because of the planar shape of the weld edges. According to another advantageous development of the invention, the weld edges can, for example, be shaped such that they bend from a horizontal plane into a vertical plane when the flanks of the projections are made to begin melting by a heating element arranged between the weld edges. The heating element may subsequently remain in the wall of the fuel tank. As a result, the heating element can, moreover, be arranged reliably in its intended position in the weld edge. The heating element may be designed, for example, as one or more heating wires lying next to one another. The heating of the heating element may be generated, for example, by electric current, magnetic induction, heat conduction or by micro-oscillations. A further advantage of this method is that it allows regions of the plastic parts to which access is difficult to be welded easily.

The method according to the invention makes possible a particularly cost-effective production of the plastic component if the heating element is placed into an injection mold for at least one of the shell parts, in the region of the weld edge, and if the plastic for the shell parts is subsequently introduced into the injection mold.

The method according to the invention can be carried out particularly easily and quickly if the shell parts are pressed together and the heating element is subsequently heated. The heating element reliably begins to melt the plastic at points precisely intended for this purpose in mutually opposite regions of the weld edges. This allows regions in which the shell parts are welded to one another to be fixed very exactly, and regions of the weld edges forming spacers for the intended shape of the plastic component to remain.

With the method according to the invention, a particularly reliable sealing effect of the plastic component designed as a fuel tank can be ensured if the projections of two shell parts to be connected to one another are designed as overlapping butt straps.

The plastic component, designed as a fuel tank and produced by the method according to the invention has particularly close tolerances and high dimensional accuracy if the shell parts are put together in a mold corresponding to the plastic component and if a gas is subsequently introduced into the shell parts and subjected to pressure for the pressing of the shell parts. Heated air, for example, is suitable as the gas.

The method according to the invention requires particularly low expenditure for producing the plastic component with high dimensional accuracy if radially outward-protruding ribs are produced at the weld edges and if a heating element is arranged between the ribs. As a result, the shell parts can be pressed together easily at the ribs using a pair of tongs or two mutually opposite pressure rollers running along the ribs. In this case, the regions of the weld edges next to the ribs stay cold and remain un-deformed during welding.

The additional need of providing a fuel tank having a reliable seal and a precise shape, is fulfilled according to the invention by a heating element being arranged between the shell parts, in the region of the weld edges. Because the heating element can be heated uniformly over its entire length, it is ensured that mutually opposite regions of the shell parts are welded to one other. In the event of a leak, the heating element can be re-heated, until the shell parts of the fuel tank according to the invention are reliably fused with one another. The shape of the fuel tank is in this case changed only insignificantly.

The fuel tank according to the invention is particularly cost-effective if the heating element has at least one heating wire. As a result, the heating element can be heated, for example, by electric current, induction by heat conduction or by micro-oscillations.

DETAILED DESCRIPTION

Figure 1A:
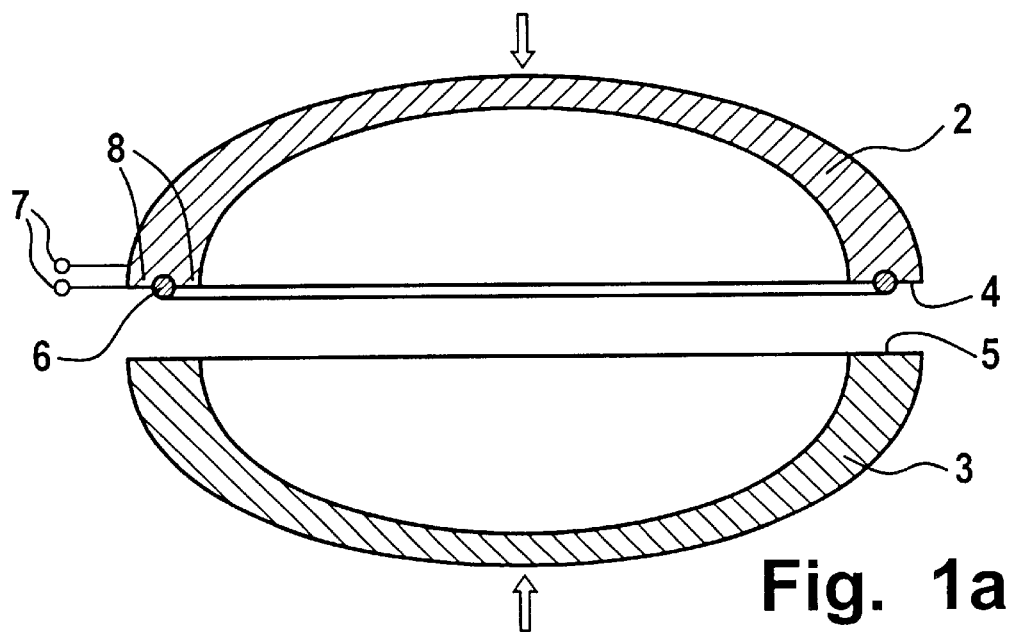
FIGS. 1a and 1b are cross-sectional views showing two steps of a method according to the present invention for producing a fuel tank.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated and described herein.

Figure 1B:
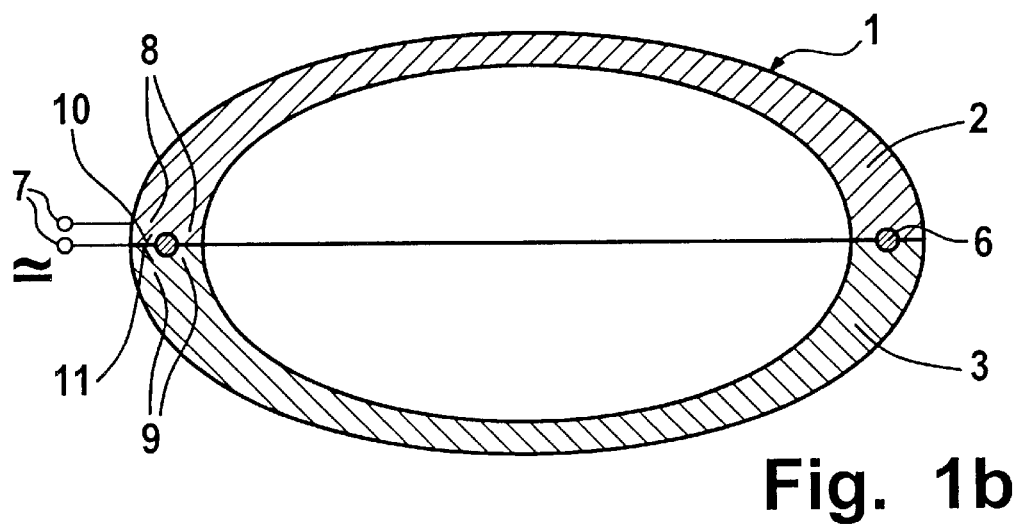

FIG. 1a shows two shell parts 2, 3, which are produced from plastic by the injection-molding process, which are used for forming a fuel tank 1, represented in FIG. 1b, and each shell part 2, 3 has a weld edge 4, 5. One of the shell parts 4 is produced integrally with a heating element 6 in the form of a wire. Leading outward from the heating element 6 are connection leads 7. The heating element 6 penetrates shell part 2 with half its diameter into the weld edge 4. As a result, the weld edge 4 forms, laterally next to the heating element 6, projections 8 pointing toward the weld edge 5 of the opposite shell part 3. For welding, the shell parts 2, 3 are initially moved toward one another, until the heating element 6 comes up against the opposite weld edge 5. An electric voltage is subsequently applied to the connection leads 7 and the heating element 6 is heated. As FIG. 1b shows, the heating element 6 melts into the opposite weld edge 5, represented in FIG. 1a. As this happens, projections 9 likewise form in this weld edge 5. The projections 8, 9 of the weld edges 4, 5 bear with their flanks 10, 11 against the heating element 6. This ensures that the weld edges 4, 5 are made to begin melting in the region of the heating element 6. At a distance from the heating element 6, the projections 8, 9 are heated only insignificantly, so that they remain stable and ensure that the shell parts 2, 3 can be pushed together only as far as an intended position. The shell parts 2, 3 are subsequently welded to form the fuel tank 1. The heating element 6 remains in the fuel tank 1.

Figure 2:
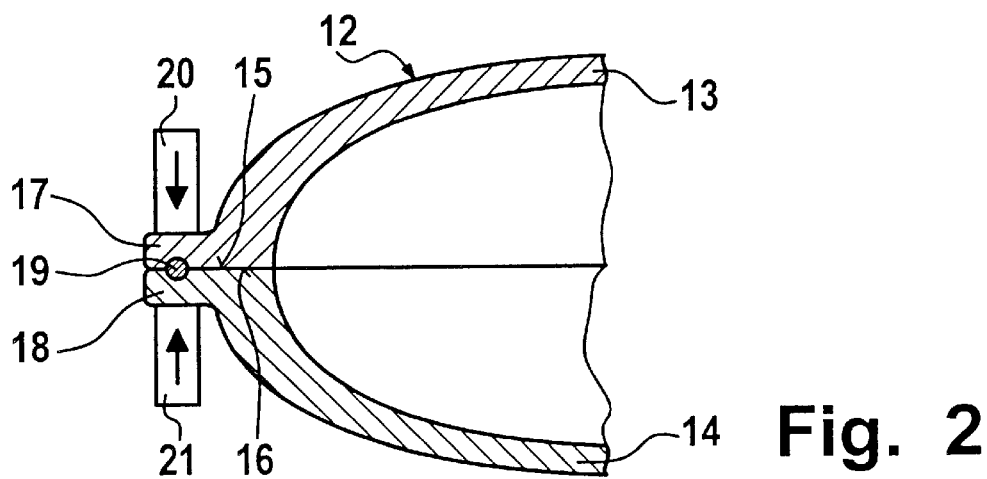
FIG. 2 shows a partial cross-sectional view of a fuel tank during the pressing of shell parts.

FIG. 2 schematically shows a partial region of a fuel tank 12 for a motor vehicle, having two shell parts 13, 14. The shell parts 13, 14 each have a weld edge 15, 16, from which a rib 17, 18 respectively protrudes radially outward. A heating element 19 is arranged in the ribs 17, 18. Like the element from FIG. 1, the heating element 19 melts into the weld edges 15, 16. On the outer side, the ribs 17, 18 are pressed together. This pressing may be produced by dies 20, 21 or by rollers, not represented, running along the ribs 17, 18. Since the regions of the weld edges 15, 16 that are radially inner regions, as seen from the ribs 17, 18, are not made to begin melting by the heating element 19, the shell parts 13, 14 remain in their intended positions irrespective of the pressing pressure of the dies 20, 21.

Figure 3A:
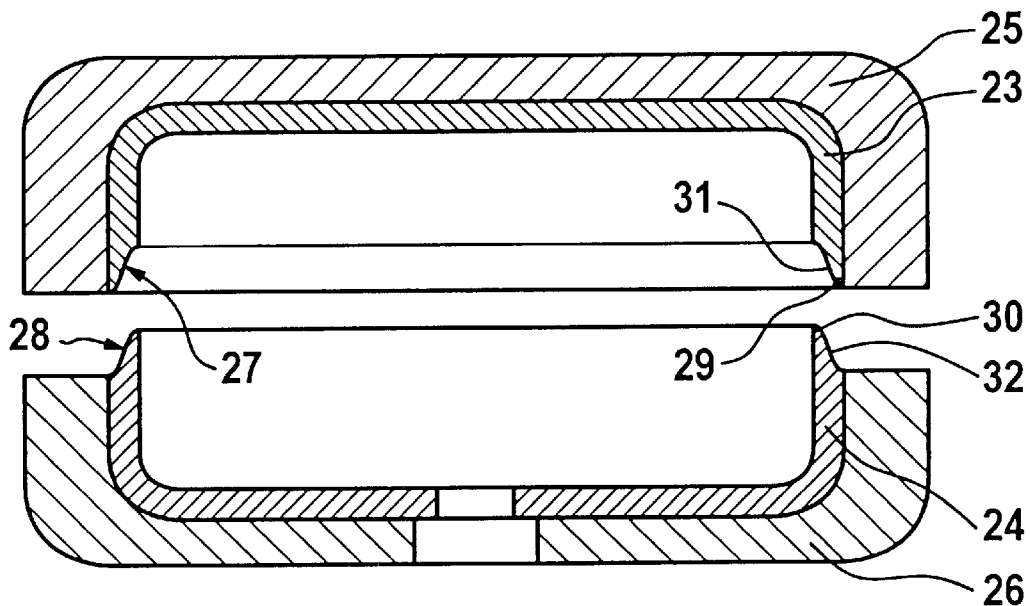
FIGS. 3a and 3b are cross-sectional views showing two steps of a further embodiment of a method according to the present invention.
Figure 3B:
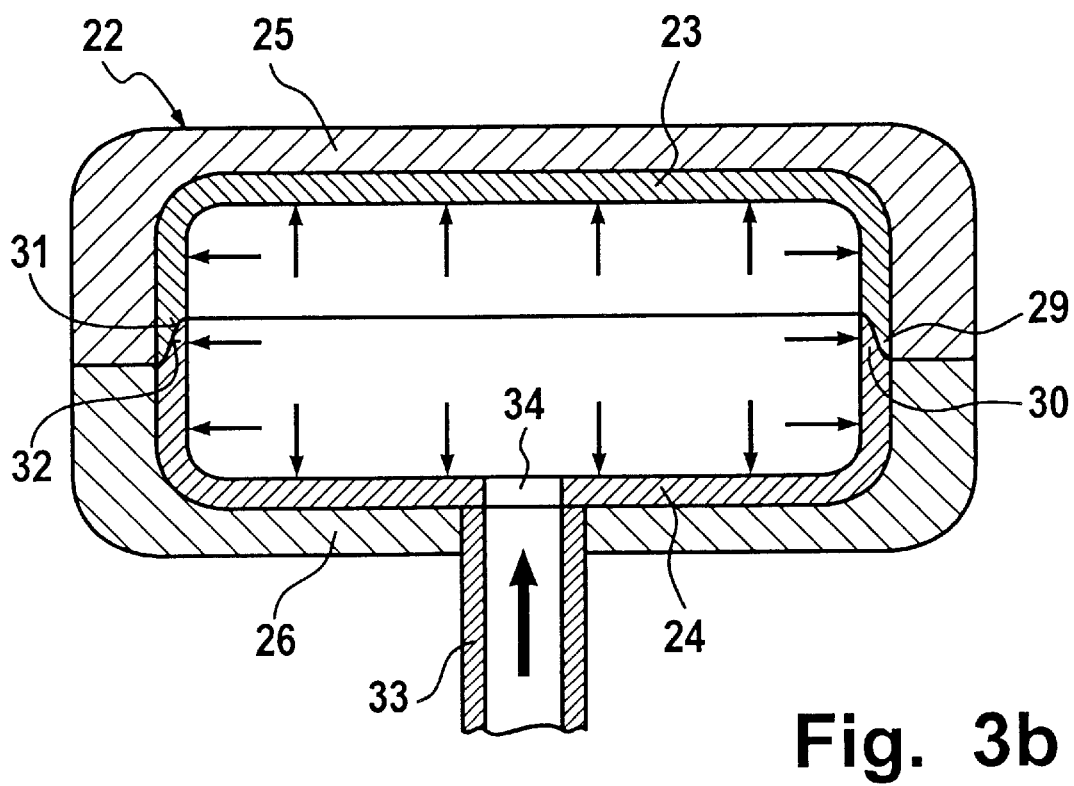

FIG. 3a schematically shows a method according to the invention for producing a fuel tank 22 represented in FIG. 3b, in which mold parts 25, 26 are shaped to correspond to the mutually opposite shell parts 23, 24 respectively in the fuel tank 22. The shell parts 23, 34 each have a weld edge 27, 28 with a projection 29, 30. Facing flanks 31, 32 of the projections 29, 30 are made to begin melting and the mold parts 25, 26 are moved toward one another until, as represented in FIG. 3b, they bear against one another. The heating of the flanks 31, 32 may take place for example by heat radiation or, as in the case of the method represented in FIG. 1a and 1b, by heating elements. The projections 29, 30 of the weld edges 27, 28 are arranged offset in relation to one another, so that they are designed as overlapping butt straps. A pressure connection 33 is subsequently placed against an opening 34 of one shell part 24 and the cavity formed by the shell parts 23, 24 is subjected to pressure. As this happens, the projections 29, 30 are pressed against one another and their flanks 31, 32 are welded to one another. As this happens, the shell parts 23, 24 are pressed against the mold parts 25, 26, so that the fuel tank 22 is given a particularly exact shape.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of producing a plastic component, comprising:

producing primary shell parts from plastic by an injection-molding process;

heating and pressing abutting weld edges of the shell parts to weld said shell parts, wherein projections pointing toward respective opposite shell parts are produced at the weld edges and wherein flanks of the projections of two weld edges are heated;

wherein the flanks of the projections are made to begin melting by a heating element located at one of the weld edges; and wherein the heating element is placed into an injection mold for at least one of the shell parts, in the region of the weld edge, and wherein the plastic for the shell parts is subsequently introduced into the injection mold.

2. The method as claimed in claim 1, wherein the shell parts are pressed together and the heating element is subsequently heated.

3. The method as claimed in claim 1, wherein the projections of two shell parts to be connected to one another are designed as overlapping butt straps.

4. The method as claimed in claim 1, wherein the shell parts are put together in a mold corresponding to the plastic component and wherein a gas is subsequently introduced into the shell parts and subjected to pressure for the pressing of the shell parts.

5. The method as claimed in claim 1, wherein radially outward-protruding ribs are produced at the weld edges and wherein a heating element is arranged between the ribs.

6. The method as claimed in claim 5, wherein the shell parts are pressed in the region of their ribs.

7. The method as claimed in claim 1, wherein the projections are produced by the injection-molding process.

* * * * *